JOSEPH E. WARE.
Improvement in Furnaces for Reducing Ores.
No. 114,734. Patented May 9, 1871.

WITNESSES

Joseph E. Ware.
INVENTOR

UNITED STATES PATENT OFFICE.

JOSEPH E. WARE, OF ST. LOUIS, MISSOURI.

IMPROVEMENT IN FURNACES FOR REDUCING ORES.

Specification forming part of Letters Patent No. 114,734, dated May 9, 1871.

*To all whom it may concern:*

Be it known that I, JOSEPH E. WARE, of St. Louis, in the county of St. Louis and State of Missouri, have invented certain Improvements in Reduction-Furnaces, of which the following is a specification.

The first part of my invention relates to a combination of an open-mouthed or other-shaped furnace, with certain methods of supplying and arranging the various ores, fuel, fluxes, and other agents used in the reduction of ores of metals to a metallic or any other intermediate or marketable condition, in connection with exhaust or pressure blasts or drafts.

The second part relates to the manner by which certain processes are applied and certain metallurgical results produced.

Figure 1:
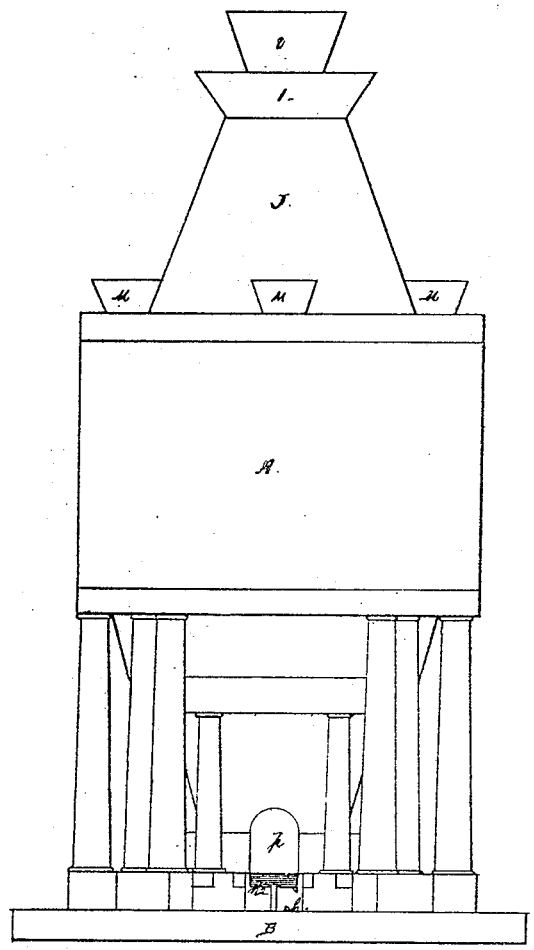
Figure 3:
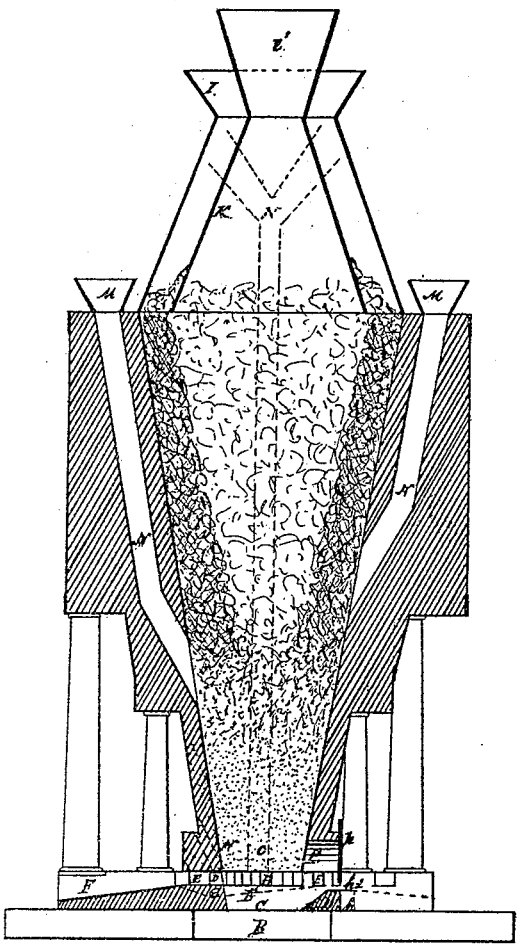
Figure 2:
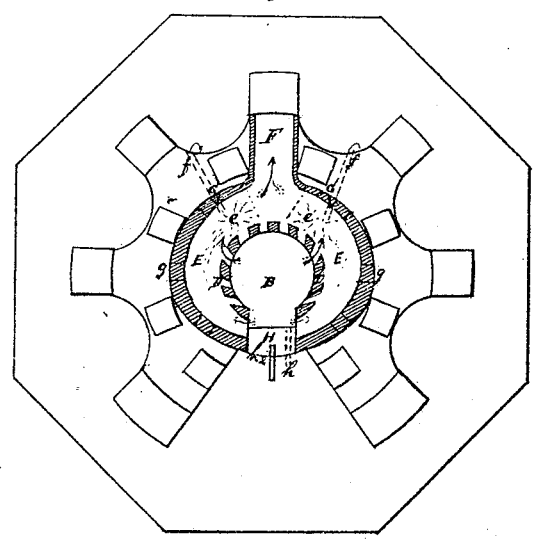

Figure 1 is an elevation of the furnace. Fig. 2 is a plan of the hearth and foundation, showing the draft-openings, the bottoms, pools, and tap-holes of the exhaust-wings, the apertures for the supply of ores to the hearths of the wings, the work-doors, and the exhaust-channel. Fig. 3 is a sectional view, exhibiting the manner of feeding the ores, fuel, and other substances into the inner and outer feed-hoppers over the jacketed hood, and the arrangement of ores and other substances inclosing the fuel, for the protection of the linings and inwalls and the utilization of the heat and gases, the auxiliary flues or tubes for special uses, and the manner of changing the points of action of the descending air-currents and agencies for the accomplishment of the intended results.

A is the furnace or structure, which may be built of any suitable material, size, proportions, or style. Its scale of one-quarter inch represents a total height of thirty feet. B, bottom stone, which, for iron or copper smelting, may be a hard, well-seasoned sandstone, of one piece if possible, otherwise close-jointed.

For the reduction of common pure lead ores, tin, argentiferous or quartzose lead ores, slags, or any of the oxides or metallic compounds that afford corrosive oxides in smelting, granite, porphyry, or gneiss should be used.

C is the hearth or crucible; D D, the exhaust-outlets; E E, the exhaust-wings, which are to receive the heat drawn from the central furnace, the heated exhaust or pressure currents, by which easily-fusible ores may be reduced, melting, calcining, changing, drying, or any other appropriate operation that will utilize the heat in a secondary way may be performed; $e\,e^1$, hearths or bottoms of exhaust-wings; $e\,e^2$, pools at the lowest part of the hearths, to collect the metal in; F, exhaust-channel, to be led through fume-chambers or other recovery means for valuable volatilized substances, intermediate between the furnaces and the exhaust or means used; $f f$, tap-holes, for running out the metal from the pools $e\,e^1$; G G, work-doors; $g\,g$, feed-openings, to supply materials to the wing-furnaces; H, dam-stone; $h^1$, tap-hole; $h^2$, slag-vent; $k$, Figs. 1, 3, hood, with inner hopper for distributing the ores and substances around the sides of the furnace, by which arrangement the ores and other substances intervene between the fuel and the inwalls and lining; J, jacket, with outer hopper I, to aid in support of hopper, and prevent access of air at the lower edges of the hood when the side tubes or their equivalent may be brought into action; $i$, hopper, passing through the apex of the hood, through which the fuel is mainly to be fed, which causes the fuel when ignited to remain as a drying, volatilizing, and carbonizing core in the encircling ores, fluxes, and substances charged through hopper I, where it is expected to retain its relative position, except as to height, for purposes to be hereinafter described; N N, tubes or openings in the walls or elsewhere, fire-proof, and to be large enough for the transmission of fuel, or mixed fuel and ore, or general charging ingredients, air, or specific substances; P, tymp-stone; $p$, fore-plate.

The theory and operation of my furnace are (and its use has generally confirmed them) that, to the metallurgist, it is of the greatest importance that, in certain operations, there should be a capacity of division or substitution into the use of flaming and flameless fuel, partly on account of the chemical composition of the fuel, and to enable in some cases the one, in others the other, to produce the desired effect, either to afford hydrogen, and consequently free carbon, or to burn another forming and yielding no carbureted hydrogen in its combustion; to afford the means of burning fuel, consisting chiefly of carbon, or such as consists chiefly of carbon and hydrogen, and to be enabled to obtain the highest estimated value of fuel to the metallurgist, pure carbon, two points of action are combined, either being adapted, from its relation to the other, to the end in view.

In most common furnaces but little heat is obtained compared with the fuel consumed and amount of heat produced, the loss being in increasing ratio with the increase of heat and time. By the envelopment of the fuel for a large portion of the distance that the charge travels toward complete reduction, the estimated value of the fuel used is much more perfectly secured, as the inward draft secures high activity at the right point.

As all the heat generated by combustion must be contained in the products of combustion, it is better that it should be absorbed by the ores and fluxes than by the dead walls of a furnace or expelled into the air. There is an obvious advantage, therefore, gained before the charge comes down to the point of commingling of the two elements to convert all the carbon into carbonic acid, and as combustion has to be carried on in atmospheric air, enough of it to supply two and one-half pounds of oxygen to each pound of carbon must be furnished with some excess. I therefore prefer the exhaust or exhaust and pressure of air downward through the furnace as best adapted to secure positive and total combustion and immunity from unconsumed air or oxygen.

As hydrogen does not furnish a high degree of heat, when its use is desirable I prefer the introduction of it through the auxiliary passages.

The combustion of fuel, convergence and commingling of the charge, and incipient reduction secure constant movement and descent of the contents from three to eight feet above the line O, the height of furnace varying, and the substances being reduced thence downward. The production of metal is very rapid. The neutralization of oxygen being perfect, the result must be positive.

To use my furnace for the treatment of sulphurous ores and sulphurets, proper attention must be given to a regulated heat, to prevent agglutination of the easily-melted ores. Scrap-iron, protoxide of iron, magnetic oxide of iron or lime, used in excess, will desulphurize such ores with economy of fuel.

In the reduction of sulphurets the use of the above-described absorbents secures the recovery of nearly every particle of metal in the ores, particularly with those of copper and lead, when regard is had to the laws that "quantity increases affinity;" that in exceptional cases of metals the "absorbents should not be in greater quantity than to produce the metals in their pure condition;" and in other cases, "where too little of the absorbent is present the metal has a superior affinity for volatile matters or silex, causing loss of metal in the slags or waste in escape."

In the manufacture of iron in the common furnaces, sulphur, phosphorus, or silex cannot be removed entirely when carbon is present; nor can carbon be easily removed from metal when heated.

The manner of freeing metals from these substances in my furnace is as follows:

An excess of free oxygen or chlorine over the carbon or hydrogen present, if admitted through the side tubes, frees a melted metal from sulphur and silex.

Phosphorus, being more easily oxidized than sulphur when united with the melted metal, combines readily with alkalies or alkaline earths. The phosphorus is, therefore, by this means removed from the metal.

Any oxide may be converted, at a low heat, into a soluble chloride in the above-described furnace by charging common salt at the furnace-mouth, or by chlorine with large quantities of air. In this manner chlorine will remove all other matters from metals that are in a state of fusion.

To dechlorinate chlorides or any metal in my furnace, and considering that chlorine is not decomposed until liberated by heat or any means, it is therefore subjected to continued heated furnace action, which alone will remove it, access of air or steam converting it into hydrochloric acid; or the evaporated chlorine may be condensed.

When zinc-oxides or other oxides from impure ores are to be made, a slight excess of one of the absorbents should exist over the quantity of sulphur present in the ore and fuel, and by the opening of the side tubes there is secured a very pure oxide.

Iron may be decarbonized to any desirable extent, as rapidly as it is revived, by drawing air through the lowest side tubes as well as the mouth of the furnace, the trickling drops of metal freely parting with their carbon on account of its greater affinity for oxygen. A very pure metal is thus made with care and attention; and such alloying substances as tungsten, titanium, or any other desirable agent may be introduced in a finely-pulverized state directly into the purified fluid metal in the hearth, or any condition of carbonization or decarbonization secured that is desirable.

To entirely change the normal action of the furnace for any special operation the passage of air through the mouth of the furnace can be prevented by placing in the hoppers anything too large to pass through, and covering with coal-dust or lime. In a like manner the hoppers over the side tubes may be closed. The draft and feed may then be entirely directed through these openings, and a varied nature of substances introduced, as the special purpose of the change may demand.

That the combustion near the mouth of the furnace may not be too active the opening of one or more of the side tubes or a division of the drafts will operate as a check.

Operations upon the hearths of the wing-furnaces may be reverberatory or blast in effect.

Most of the heat drawn out of the central furnace through openings D D can be utilized in the reduction of any easily-reduced metal or substances that may be placed upon the hearths. Any requisite amount of air, therefore, can be drawn through the feed-doors nearest the tymp. The entire available heat, after leaving the central furnace, can be absorbed in smelting or other operations in the appended wing-furnaces.

Ores containing precious metals, particularly silver, may be amalgamated or alloyed with zinc by supplying the metallic zinc to the fluid metal in excess over the ascertained quantity of the precious metal present that will alloy therewith, provided the heat of the metal be lower than the volatilizing point of the zinc. Zinc, from its low affinity for lead, will separate from the lead through varied gravity, leaving the silver combined with the zinc, from which it may be separated by volatilization.

Special fuel, or such as will yield gases of reductive or other properties, as sawdust, oils, resin, steam, &c., for the production of hydrogen, &c., may be introduced through the auxiliary ducts to any desirable level in the furnace, as the number of ducts may be from one to many, and opening at any point intended, from the outlets D D upward.

By the operative changes and the agents already described, and with but few others, all the general and many of the special results may be obtained that relate to reduction, conversion, changing, calcination, melting, drying, or other uses, either by the direct heat of the central furnace or by the heat that may be drawn off and used in the secondary operations and processes.

The fuel-arrangement is for the purpose of protecting inwalls and linings in furnaces, and utilizing, in a superior manner, the fuel and gases, in combination with the furnace and appendages, wherein the inner lines of the furnace are calculated and so arranged with regard to pressure of draft, intensity of heat, reductibility of charge, and the lowest time requisite as to effect perfect results in reduction, conversion, or change, with economy in fuel and materials used therefor.

Glass can be readily made in my furnace by charging the ingredients preferably in a caked condition.

Scaffolding of the charge at any time can be removed by "cutting down" charges of fuel sent through the side tubes with strong blast.

The slope lines of the lining and inwalls, to secure accurate working should be uninterrupted, and for the reduction of iron or for desulphurating ores, the angle should be seventy to eighty degrees.

For active charges, as lead, tin-oxide, and for other operations, the lines may be vertical, with heights varying from nine feet, for the smelting of pure roasted sulphurets of lead, to thirty feet, for specular and magnetic oxides of iron. Pure ores of tin, oxides of copper, most slags, and argentiferous galena will require a height of nine feet, with lines from the vertical to not lower than eighty-five degrees.

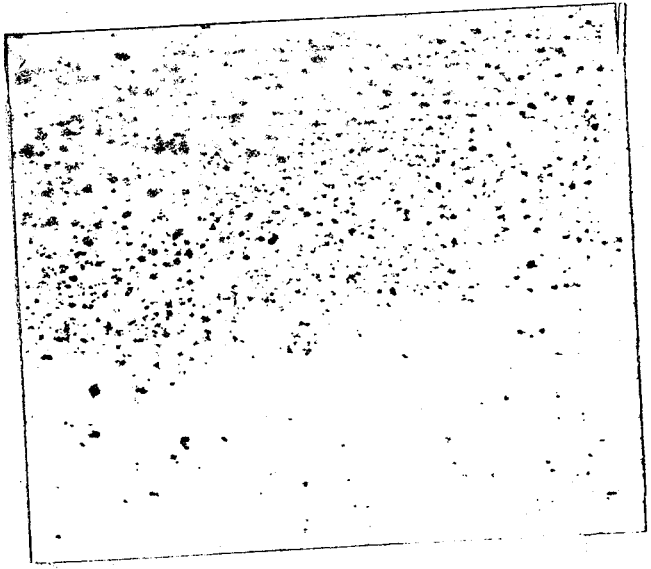

I claim—

1. The open-mouthed furnace, or one with lines of given angles up to the vertical, in combination with exhaust or exhaust and pressure drafts.

2. Feeding fuel, ores, and other materials into a furnace through hoppers, and over a jacketed hood, with a central hopper, either separately or mixed, to produce intended arrangement and results, in combination with an open-mouthed furnace, or an open-mouthed furnace combined with exhaust or other drafts.

3. The auxiliary tubes or ducts in the side walls or elsewhere, combined with the above-described furnace and combinations, for the uses specified or other to which applicable.

4. The dependent or wing furnaces, or anything equivalent, combined with the furnace, parts, and methods already described.

JOSEPH E. WARE.

Witnesses:
ALONZO HUGHES,
JNO. D. PATTEN.